(12) United States Patent
Wainer

(10) Patent No.: US 8,299,440 B2
(45) Date of Patent: Oct. 30, 2012

(54) RADIATION DETECTOR FOR COUNTING OR INTEGRATING SIGNALS

(75) Inventor: Naor Wainer, Zichron Yaakov (IL)

(73) Assignee: Koninklijke Philips Electronics N.V., Eindhoven (NL)

( * ) Notice: Subject to any disclaimer, the term of this patent is extended or adjusted under 35 U.S.C. 154(b) by 394 days.

(21) Appl. No.: 12/746,332

(22) PCT Filed: Dec. 12, 2008

(86) PCT No.: PCT/IB2008/055259
§ 371 (c)(1),
(2), (4) Date: Jun. 4, 2010

(87) PCT Pub. No.: WO2009/083847
PCT Pub. Date: Jul. 9, 2009

(65) Prior Publication Data
US 2010/0246919 A1   Sep. 30, 2010

Related U.S. Application Data

(60) Provisional application No. 61/015,207, filed on Dec. 20, 2007.

(51) Int. Cl.
*G01T 1/24* (2006.01)
(52) U.S. Cl. .......... 250/370.06; 250/363.04; 250/370.09

(58) Field of Classification Search ............... 250/336.1, 250/363.02, 363.03, 363.04, 370.06, 370.08, 250/370.09
See application file for complete search history.

(56) References Cited

U.S. PATENT DOCUMENTS

| | | | |
|---|---|---|---|
| 4,893,015 A | 1/1990 | Kubierschky et al. | |
| 5,689,115 A | 11/1997 | Balan et al. | |
| 7,105,828 B2 | 9/2006 | Unger et al. | |
| 7,170,049 B2 | 1/2007 | Iwanczyk et al. | |
| 2003/0122084 A1 | 7/2003 | Desaute et al. | |
| 2006/0056576 A1 | 3/2006 | Hoffman et al. | |

OTHER PUBLICATIONS

Frach, T., et al.; Assessment of Photodiodes as a Light Detector for Pet Scanners; 2004; IEEE Nuclear Science Symposium Conf. Record; vol. 7:4177-4181.
Pedersen, F., et al.; Using a Hybrid Pixel Detector for Dynamic Radiography; 1997; IEEE Nuclear Science Symposium Conf. Record; pp. 1239-1243.
Mukhanov, O. A., et al.; High-resolution ADC operation up to 19.6 GHz clock frequency; 2001; Hypress Inc.; Issue 12: abstract.

*Primary Examiner* — Mark R Gaworecki

(57) ABSTRACT

A radiation sensitive detector array (112) includes a photo sensor (204) that detects a photon and generates a signal indicative thereof. The radiation sensitive detector array (112) also includes a signal analyzer (214) that energy bins and counts the signal when the signal analyzer (214) is able to identify the signal in the output of the photo sensor (204), and that integrates the output of the photo sensor (204) over an integration period when the signal analyzer (214) is not able to identify the signal in the output of the photo sensor (204).

25 Claims, 4 Drawing Sheets

RADIATION DETECTOR FOR COUNTING OR INTEGRATING SIGNALS

CROSS REFERENCE TO RELATED APPLICATIONS

This application claims the benefit of U.S. provisional application Ser. No. 61/015,207 filed Dec. 20, 2007, which is incorporated herein by reference.

The following relates to a radiation sensitive detector, and finds particular application to computed tomography (CT). However, it also amenable to other medical imaging applications and to non-medical imaging applications.

A computed tomography (CT) scanner includes an x-ray tube that emits polychromatic radiation that traverses an examination region. A detector array, which subtends an arc on a side of the examination region opposite of the x-ray tube, detects radiation that traverses the examination region. The detector array generates a signal that is indicative of the examination region. A reconstructor reconstructs the signal and generates volumetric image data indicative of the examination region. An image processor processes the volumetric image data to generate one or more images of the examination region.

With a CT scanner that includes a conventional integrating, or indirect conversion detector, such as a Gadolinium Oxysulfide (GOS) based detector, the resulting image has included pixels represented in terms of grey scale values corresponding to relative radiodensity. Such information reflects the attenuation characteristics of the scanned subject matter and generally shows structure such as anatomical structures within a patient, physical structures within an inanimate object, or the like.

Unfortunately, the x-ray attenuation through a given object is strongly dependent on the incident x-ray photon energy. This physical phenomenon manifests itself in an image as beam-hardening artifacts, such as, non-uniformity, shading, and streaks. Some beam-hardening artifacts can be easily corrected, but other beam-hardening artifacts may be more difficult to correct. In addition, a highly attenuating material with a low density may result in the same CT number in the image as a less attenuating material with a high density. Thus, there is little or no information about the material composition of a scanned object based solely on the CT number.

Capturing spectral characteristics of the radiation provides more information, which can be used to mitigate beam hardening artifact and provide information about the material composition of the scanned object. Integrating detectors generally are poorly-suited to count due to a low signal-to-noise ratio (SNR). In contrast, counting direct conversion detectors such as a Cadmium Zinc Telluride (CdZnTe or CZT) or a Cadmium Telluride (CdTe) based detector can capture spectral information, for example, by concurrently counting photons and measuring the energy of the photons.

However, counting detectors generally are poorly suited for CT applications since such detectors typically are unable to count photons for x-ray fluxes above ten (10) mega-counts per second (Mcounts/sec), and some x-ray tubes can deliver more than 10 Mcounts/sec, for example, counts such as 100 Mcounts/sec. The photon flux can be reduced to a level at which the counting detector electronics can count the photons; however, reducing the photon flux as such can lead to a decrease in the SNR, and, more significantly, to a decrease in the dynamic range that is unacceptable to CT. Moreover, direct conversion counting detectors generally are poorly-suited to integrate due to the high after glow.

Aspects of the present application address the above-referenced matters and others.

According to one aspect, radiation sensitive detector array includes a photo sensor that detects a photon and generates a signal indicative thereof. The radiation sensitive detector array also includes a signal analyzer that energy bins and counts the signal when the signal analyzer is able to identify the signal in the output of the photo sensor, and that integrates the output of the photo sensor over an integration period when the signal analyzer is not able to identify the signal in the output of the photo sensor.

According to another aspect, a medical imaging apparatus includes a radiation source that emits radiation that traverses the examination region and a detector array that detects radiation that traverses the examination region. The detector array includes a photo sensor that detects radiation and generates an electrical signal indicative thereof. A digitizer produces a digital output that includes a digital representation of the electrical signal. A signal analyzer energy bins and counts the digital representation of the electrical signal in the digital output when the signal analyzer is able to identify the digital representation of the electrical signal in the digital output, and integrates the digital output when the signal analyzer is unable to identify the digital representation of the electrical signal in the digital output.

According to another aspect, a method includes determining whether digitized pulses in a digitized signal are identifiable from each other, wherein each digitized pulse corresponds to the energy of a detected photon from a radiation beam emitted by a medical imaging system. The method further includes energy-resolving the digitized pulses when the digitized pulses are identifiable from each other. The method further includes integrating the digital signal when the digitized pulses are not identifiable from each other.

The invention may take form in various components and arrangements of components, and in various steps and arrangements of steps. The drawings are only for purposes of illustrating the preferred embodiments and are not to be construed as limiting the invention.

Figure 1:
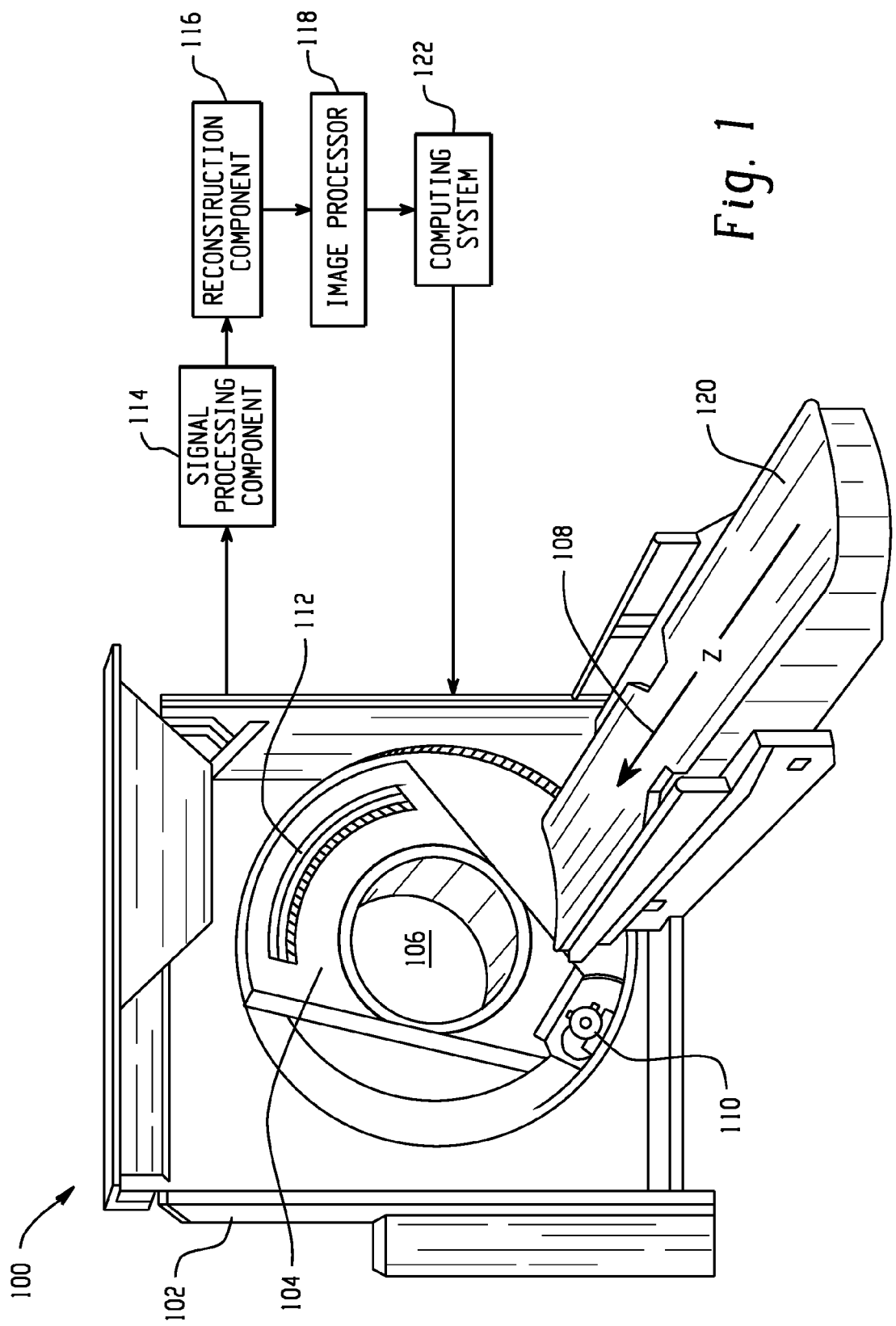
FIG. 1 illustrates a medical imaging apparatus.

Initially referring to FIG. 1, a computed tomography (CT) scanner 100 includes a stationary gantry 102, which is stationary in the sense that it is generally stationary during scanning. However, the stationary gantry 102 may be configured to tilt and/or otherwise be moved.

The computed tomography (CT) system 100 also includes a rotating gantry 104, which is rotatably coupled to the stationary gantry 102. The rotating gantry 104 rotates around an examination region 106 about a longitudinal or z-axis 108.

In the illustrated embodiment, a radiation source 110, such as an x-ray tube, is supported by and rotates with the rotating gantry 104 around the examination region 106. The radiation source 110 emits polychromatic radiation that traverses the examination region 106. In another embodiment, the CT system 100 is a stationary scanner with one or more of the radiation sources 110 supported by the stationary gantry 102.

A radiation sensitive detector array 112 detects photons emitted by the radiation source 110 that traverse the examination region 106. The radiation sensitive detector array 112 includes multiple rows of radiation sensitive photo sensor that extend in the z-axis direction, and multiple columns of radiation sensitive photo sensors that extend in a traverse direction. A single row detector array configuration is also contemplated.

In the illustrated embodiment, the radiation sensitive detector array 112 includes a scintillator-based photo sensor such as photodiode in optical communication with a scintillator, and the photo sensor and the signal shaping electronics are located on the same integrated circuit. The radiation sensitive detector array 112 generates an electrical signal, such as electrical currents or voltages, indicative of the detected radiation. In other embodiments, another indirect conversion detector or a direct conversion detector, which directly produces an electrical signal indicative of a detected photon, may be employed. Examples of suitable direct conversion detectors include a CZT, a CdTe, a Lead(II) oxide (PbO), a HgI based detector.

A signal processor 114 processes the signal generated the radiation sensitive detector array 112. As described in greater detail below, the signal processor 114 includes electronics that determines whether individual pulses in the signal produced by the radiation sensitive detector array 112 are identifiable based on the shape of the signal. If the signal processor 114 determines that individual pulses are identifiable, then the signal processor 114 operates in counting mode and energy resolves (energy bins and counts) the individual pulses for each integration period. If the signal processor 114 determines that individual pulses are not identifiable, then the signal processor 114 operates in integrating mode and integrates the total energy of the signal for each integration period.

The signal processor 114 can also generate a digital timing signal according to a pulse. The timing could be generated as a Leading Edge Discriminator signal, where the signal which is larger than a preset value, or as a Constant Fraction Discrimination, where the signal is a fraction of the maximum of the signal.

A reconstructor 116 reconstructs projection data from the detectors to generate volumetric data indicative of the interior anatomy of the patient. An image processor 118 processes the volumetric image data generated by the reconstructor 116 for display in human readable form.

A patient support 120, such as a couch, supports a patient in the examination region 106. The patient support 120 is movable along the z-axis 108 in coordination with the rotation of the rotating gantry 104 to facilitate helical, axial, or other desired scanning trajectories.

A general purpose computing system 122 serves as an operator console. The operator console 122 includes human readable output devices such as a display and/or printer and input devices such as a keyboard and/or mouse. Software resident on the console 122 allows the operator to control the operation of the system 100, for example, by allowing the operator to select a scan protocol, initiate scanning, terminate scanning, view and/or manipulate the volumetric image data, and/or otherwise interact with the system 100.

Figure 2:
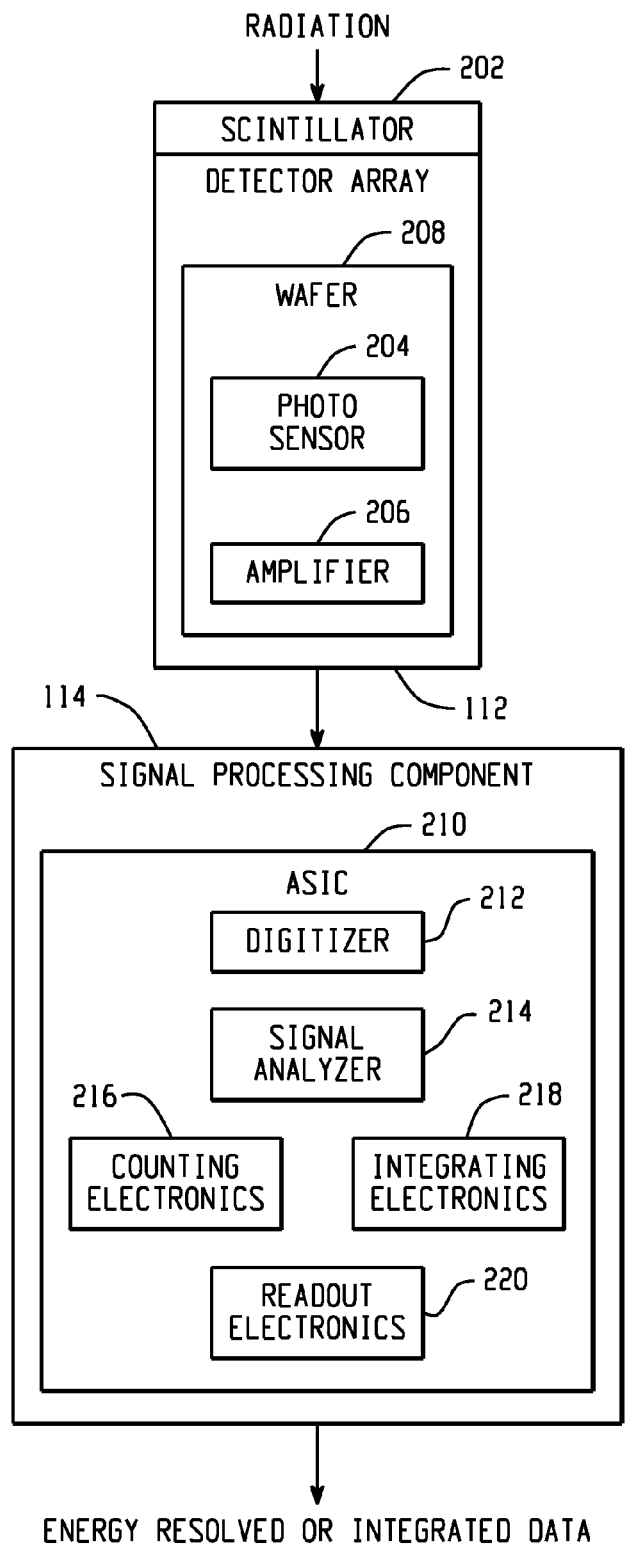
FIG. 2 illustrates an example detector array and an example signal processing component of the medical imaging apparatus.

FIG. 2 further illustrates the detector array 112 and the signal processing component 114. The detector array 112 includes a radiation sensitive photo sensor 204 that detects the radiation traversing the examination region 106. The detector array 112 comprises a scintillator 202 and a photo sensor 204. Alternatively a single direct conversion detector could be used to translate x-ray radiation into electrical signals.

In the illustrated example, the scintillator 202 is a fast scintillator. For instance, the scintillator 202 may have a decay time in a range from about zero (0) nanoseconds (ns) to about forty (40) ns with low afterglow. As such, the scintillator 202 can generate on the order of between twenty (20) to sixty (60) photons per impingent keV of x-ray event. Examples of such scintillators include $Lu_3Al_5O_{12}$:Pr (LUAG), $LuAlO_3$:Ce (LuAp), $Lu_2SiO_5$:Ce (LSO), $Lu_2Si_2O_7$: Ce (LPS), LaBr, LaCl based scintillators.

The illustrated photo sensor 204 is a high quality photodiode or other photo sensor. For example, the illustrated photo sensor 204 has a low dark current, a low capacitance, and a high resistivity. For instance, the illustrated sensor 204 may have a capacitance in a range fifteen (15 O pico-farads or less and a resistivity equal to or greater than one Giga-ohm (1 GΩ). Photo sensors with different capacitance and/or resistivity characteristics are also contemplated. The photon sensor could also be an Avalache Photo Diode (APD) or another photon sensor that includes multiplication of carriers to enlarge the signal.

The detector array 112 also includes an amplifier 206. The illustrated amplifier 206 is a wide bandwidth amplifier. For example, the illustrated amplifier 206 may be a one Giga-Hertz (1 GHz) or greater amplifier, for example, ten (10) GHz. Amplifiers with narrower bandwidth are also contemplated.

As shown, the photo sensor 204 and the amplifier 206 are located on the same wafer 208. As a consequence, the electrical connections between the sensor 204 and the amplifier 206 may be shorter relative to a configuration in which the sensor 204 and the amplifier 206 are located on different wafers. As a result, the signal-to-noise ratio (SNR) may be higher relative to the configuration in which the sensor 204 and the amplifier 206 are located on different wafers. The wafer 208 may be a silicon or other type of wafer.

The signal processing component 114 includes an Application Specific Integrated Circuit (ASIC) 210. The ASIC 210 includes a digitizer 212 such as an analog to digital converter (ADC). In the illustrated embodiment, the digitizer 212 is a fast digital ADC. For instance, the digitizer 212 may be a one hundred (100) Mega-Hertz (MHz), a 1 GHz or a 10 GHz digitizer.

The ASIC 210 further includes a digital signal analyzer 214. The signal analyzer 214 determines whether the ASIC 210 operates in counting mode or in integrating mode. The signal analyzer 214 identifies, from the signal from the detector array 112, whether the level of the x-ray flush is such that individual pulses can be counted. In the illustrated embodiment, the signal analyzer 214 uses a feed-forward neural network trained on low x-ray flux and high x-ray fluxes to determine whether individual pulses can be identified. In general, individual pulses can be counted for relatively low fluxes and cannot be counted for relatively high fluxes.

The ASIC 210 further includes counting electronics 216 and integrating electronics 218. The counting electronics 216 energy-bins and counts pulses for each integration period when the signal analyzer 214 determines that individual pulses can be counted. The integrating electronics 218 integrates the combined pulses over each integration period when the signal analyzer 214 determines that individual pulses cannot be counted. Alternatively the integrated electronics 218 could be activated to generate the integration value for every integration period. As the integration is digital, digital corrections could be applied to eliminate offset and non-linearities The ASIC 210 also includes readout electronics 220.

In the illustrated example, the ASIC 210 is a digital ASIC, and both the digitizer 212 and the signal analyzer 214 on located on the ASIC. This may reduce cost relative to using a mixed-signal ASIC, which can be more expensive to manufacture, without the digitizer 212. In another embodiment, the digitizer could be part of wafer 208 or the amplifier 206 could be part of the ASIC 201.

Figure 3:
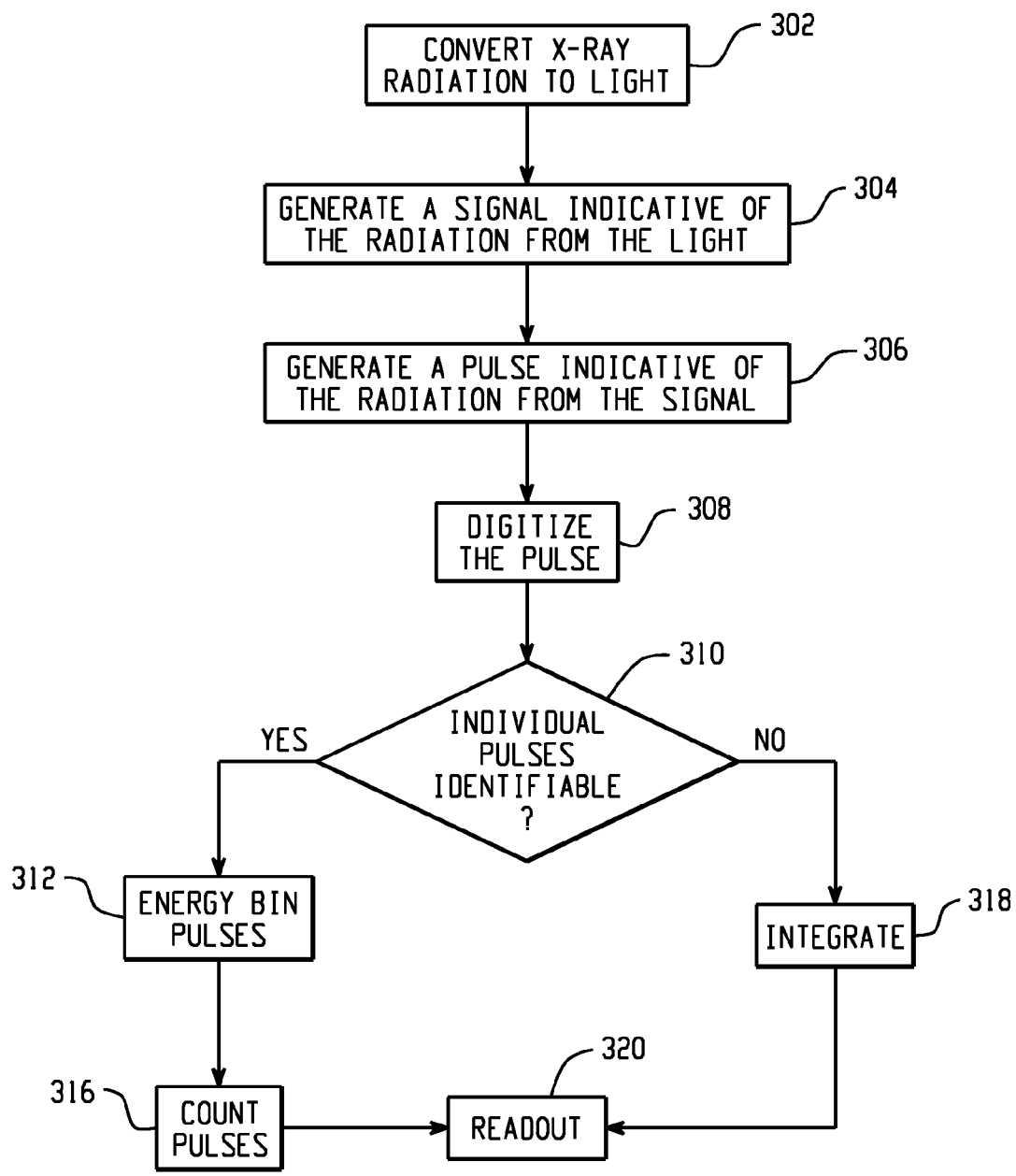
FIG. 3 illustrates a flow chart.

Operation is described in connection with FIG. 3. At 302, radiation traversing the examination region strikes the scintillator 202, which produces light indicative of the energy of the radiation.

At 304, the radiation sensitive photo sensor 204 receives the light and generates a signal indicative of the detected radiation. The signal may be an electrical signal such as an electrical current or an electrical voltage.

At 306, the amplifier 206 produces a pulse indicative of the energy of the received radiation. The pulse may be an electrical current pulse or electrical voltage pulse having peak amplitude that is indicative of the energy of the detected photon.

At 308, the digitizer 212 produces a digitized signal that includes the pulse.

At 310, the signal analyzer 214 receives the digitized signal and determines whether the pulse can be identified in the digitized signal. As noted above, a trained neural network is used in the illustrated embodiment.

Figure 4:
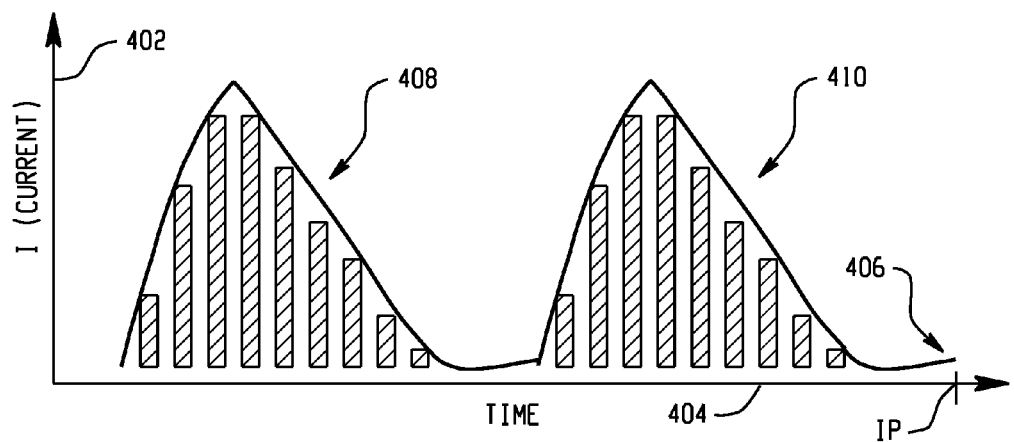
FIG. 4 illustrates digitized pulses for a relatively low x-ray flux.
Figure 5:
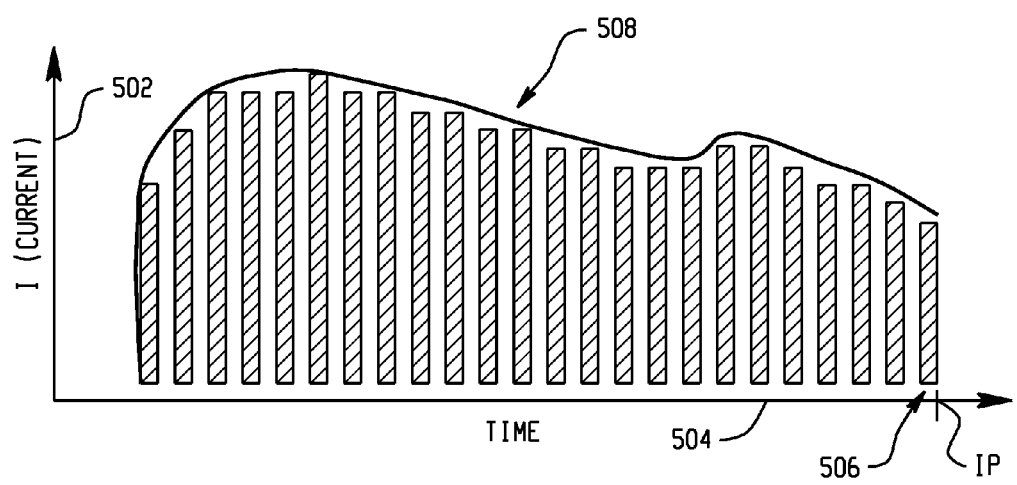
FIG. 5 illustrates digitized pulses for a relatively high x-ray flux.

FIGS. 4 and 5 show digitized pulses respectively for relatively lower and higher fluxes.

With respect to FIG. 4, a first axis 402 represents the electrical current level, and a second axis 404 represents time. The end of the integration period is indicated by reference numeral 406. As shown in FIG. 4, for relatively lower fluxes, the output of the ASIC 210 may include individual digitized pulses 408 and 410 that can be identified.

With respect to FIG. 5, a first axis 502 represents the electrical current level, a second axis 504 represents time, and the end of the integration period is indicated by reference numeral 506. As shown in FIG. 5, for relatively higher fluxes, individual pulses cannot be identified in the digitized signal.

Returning to FIG. 3, if individual digitized pulses are identifiable, then at 312 the counting electronics 216 energy bins the digitized pulses, and at 314 the counting electronics 216 counts the digitized pulses. For example, for each digitized pulse 408 and 410 the counting electronics 216 sums the samples in the digitized pulse to compute an approximate total energy of the digitized pulse, and the number of pulses for each different energy are counted and stored for each integration period 406.

Otherwise, at 318 the integrating electronics 218 integrates the digitized signal from the digitizer 212. For example, the integrating electronics 218 may sum the samples in the digitized signal 508 over the integration period 506 to generate a total energy for integration period 506. This mode could be activated for every event, regardless of whether it is possible to suitably differentiate individual events.

At 320, the processed signal is read out by the read out electronics 220.

Variations are discussed.

In the illustrated embodiment, the ASIC 210 is shown separate from the detector array 112. In another embodiment, the ASIC 210 is part of the detector array 112.

In the above discussed embodiment, the digitizer 212, the signal analyzer 214, the counting circuitry 216, the integrating circuitry 218, and the readout electronics 220 are located on the same ASIC 210. However, in another embodiment, at least one of the digitizer 212, the signal analyzer 214, the counting circuitry 216, the integrating circuitry 218, and the readout electronics 220 is located on different integrated circuits.

As described above, the ASIC 210 operates either in counting mode or in integration mode, based on the level of the x-ray flux. In another embodiment, the ASIC 210 operates in a dual mode at relatively lower fluxes in which the ASIC 210 both counts and integrates the digitized signal produced by the digitizer 212.

In another embodiment, the signal analyzer 214 determines whether individual pulses can be identified for the signal produced by the digitizer 212 by identifying a transition from a falling signal level to a rising signal level. For example, the signal analyzer 214 can determine whether such transition crosses a preset threshold level. If the transition crosses the threshold, the signal analyzer 214 determines that individual pulses are identifiable, and if the transition does not cross the threshold, the signal analyzer 214 determines that individual pulses are not identifiable.

In another embodiment, a probabilistic based approach to determining whether individual pulses can be identified for the signal produced by the digitizer 212 is employed. For instance, a correlation based techniques can be used to determine a degree of correlation between the signal produced by the digitizer 212 and individual digitized signals.

The embodiments herein were described in connection with a computed tomography medical imaging applications. However, it is to be understood that the invention may additionally or alternatively be employed with other medical imaging applications and/or non-medical imaging applications in which it is desirable to capture spectral aspects of radiation.

The embodiments herein were described with a detector 112 comprised of a scintillator 202 and photo sensors 204. However it is to be understood that any detector suited for radiation detection could be used, including direct conversion detectors.

In the case that individual pulses can be identified, a time signal can be generated, from the digitized signal, either by leading edge discrimination or constant fraction discrimination. This timing signal could be used in coincidences measurement in a PET scanner. Such a detector could be used both in CT and PET scanners. The accuracy of the timing signal may also depend on the digitization frequency. A digitization of ten (10) GHz could lead to theoretical accuracy of 200 ps, which is applicable for TOF PET.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A radiation sensitive detector array, comprising:
   a photo sensor that detects a photon and generates a signal indicative thereof;
   a signal analyzer that energy bins and counts the signal when the signal analyzer is able to identify the signal in the output of the photo sensor, and that integrates the output of the photo sensor over an integration period when the signal analyzer is not able to identify the signal in the output of the photo sensor.

2. The radiation sensitive detector array of claim 1, further including:
   electronics that receives the signal and produces an output that includes a pulse indicative of the energy of the detected photon, wherein the signal analyzer energy bins and counts the pulse when the signal analyzer is able to identify the pulse in the output of the electronics, and that integrates the output of the electronics over the integration period when the signal analyzer is not able to identify the pulse in the output of the electronics; and a wafer, wherein both the photo sensor and the electronics are located on the wafer.

3. The radiation sensitive detector array of claim 1, further including a digitizer that digitizes the output of the photo sensor, wherein the signal analyzer analyzes the digitized output to determine whether the signal is identifiable in the digitized output.

4. The radiation sensitive detector array of claim 3, wherein the signal analyzer employs a neural network to determine whether the signal is identifiable in the digitized output, wherein the neural network is trained with data including digital pulses corresponding to low x-ray fluxes and digital pulses corresponding to high x-ray fluxes.

5. The radiation sensitive detector array of claim 3, further including a digital ASIC, wherein both the digitizer and the signal analyzer are located on the digital ASIC.

6. The radiation sensitive detector array of claim 1, wherein the photo sensor includes a photodiode with a capacitance in a range of about 0 to about 15 pico farads and resistivity of at least about 1 Giga-Ohm.

7. The radiation sensitive detector array of claim 6, wherein the electronics includes an amplifier with a bandwidth of about 1 Giga-Hertz to about 10 Giga-Hertz.

8. The radiation sensitive detector array of claim 7, wherein the digitizer includes an analog-to-digital converter that samples at about 100 Mega-Hertz.

9. The radiation sensitive detector array of claim 1, wherein the radiation sensitive detector array operates in a photon counting mode when an x-ray flux corresponding to the detected photons is equal to or less than 10 Mega-counts per seconds, and the radiation sensitive detector array operates in an integrating mode when the x-ray flux corresponding to the detected photons is greater than 10 Mega-counts per seconds.

10. The radiation sensitive detector array of claim 1, wherein the radiation sensitive detector array is part of a computed tomography scanner.

11. The radiation sensitive detector array of claim 1, wherein the radiation sensitive detector array is part of a positron emission tomography scanner.

12. A medical imaging apparatus, comprising:
a radiation source that emits radiation that traverses the examination region; and
a detector array that detects radiation that traverses the examination region, the detector array including:
a photo sensor that detects radiation and generates an electrical signal indicative thereof;
a digitizer that produces a digital output that include a digital representation of the electrical signal; and
a signal analyzer that energy bins and counts the digital representation of the electrical signal in the digital output when the signal analyzer is able to identify the digital representation of the electrical signal in the digital output and integrates the digital output when the signal analyzer is unable to identify the digital representation of the electrical signal in the digital output.

13. The medical imaging apparatus of claim 12, wherein the detector array is a direct conversion detector.

14. The medical imaging apparatus of claim 12, wherein the detector array is an indirect conversion detector.

15. The medical imaging apparatus of claim 12, wherein the radiation sensitive detector array integrates the digitized output when the x-ray flux of the detected radiation is relatively high, and the radiation sensitive detector array energy-bins and counts the pulse in the digitized output when the x-ray flux of the detected radiation is relatively low.

16. A method, comprising:
determining whether digitized pulses in a digitized signal are identifiable from each other, wherein each digitized pulse corresponds to the energy of a detected photon from a radiation beam emitted by a medical imaging system;
energy-resolving the digitized pulses when the digitized pulses are identifiable from each other; and
integrating the digital signal when the digitized pulses are not identifiable from each other.

17. The method of claim 16, further including integrating the digital signal when the digitized pulses are identifiable from each other.

18. The method of claim 16, further including digitizing a signal from a radiation sensitive detector detecting the radiation beam to generate at least one of the digitized pulses.

19. The method of claim 18, wherein the radiation sensitive detector includes a photo sensor and an amplifier, and the photo sensor senses the radiation beam and the amplifier produces the signal.

20. The method of claim 19, wherein the radiation sensitive detector includes a wafer, wherein the photo sensor and the amplifier are located on the wafer.

21. The method of claim 16, further including employing a neural network to determine whether the digitized pulses are identifiable from each other.

22. The method of claim 16, further including generating a time signal from the digitized signal.

23. The method of claim 22, wherein the time signal is generated by one of leading edge discrimination or constant fraction discrimination.

24. The method of claim 22, further including using the time signal in coincidence measurements in a positron emission tomography scanner.

25. The method of claim 16, further including both energy-resolving the digitized pulses and integrating the digital signal when the digitized pulses are identifiable from each other.

* * * * *